J. F. O'CONNOR.
FRICTION SHOCK ABSORBING MECHANISM.
APPLICATION FILED NOV. 1, 1920.
1,431,324.
Patented Oct. 10, 1922.
4 SHEETS—SHEET 1.
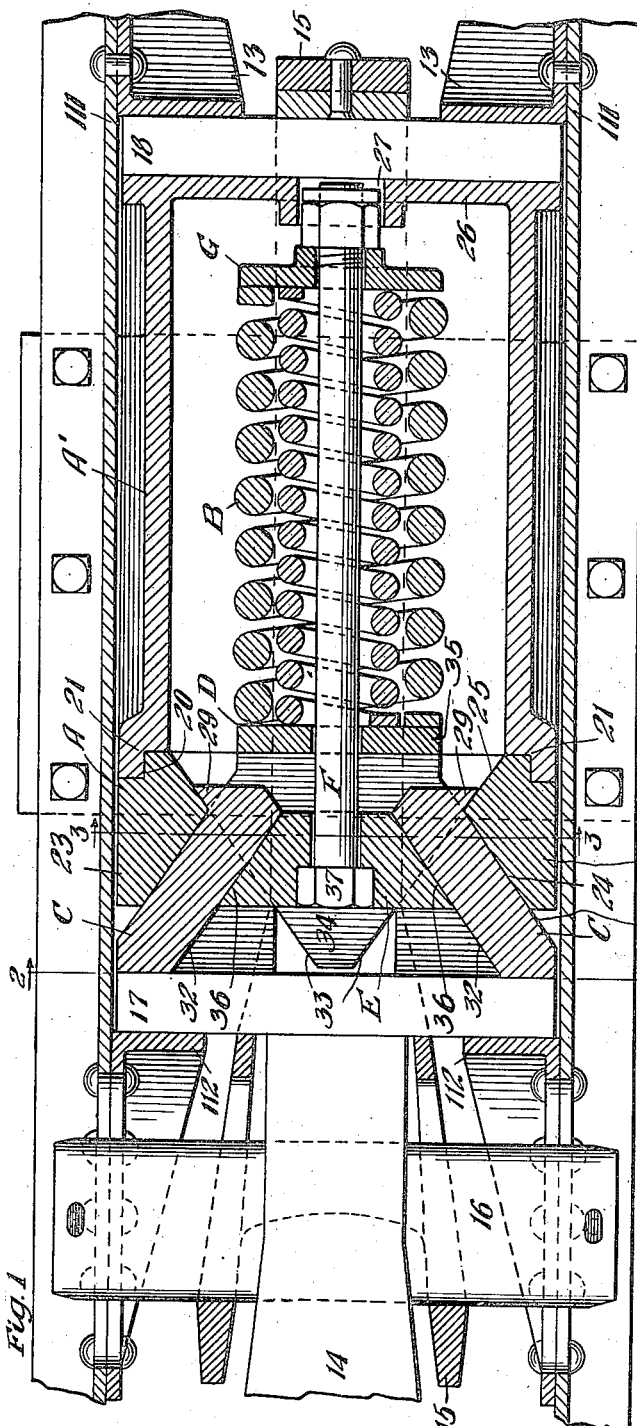
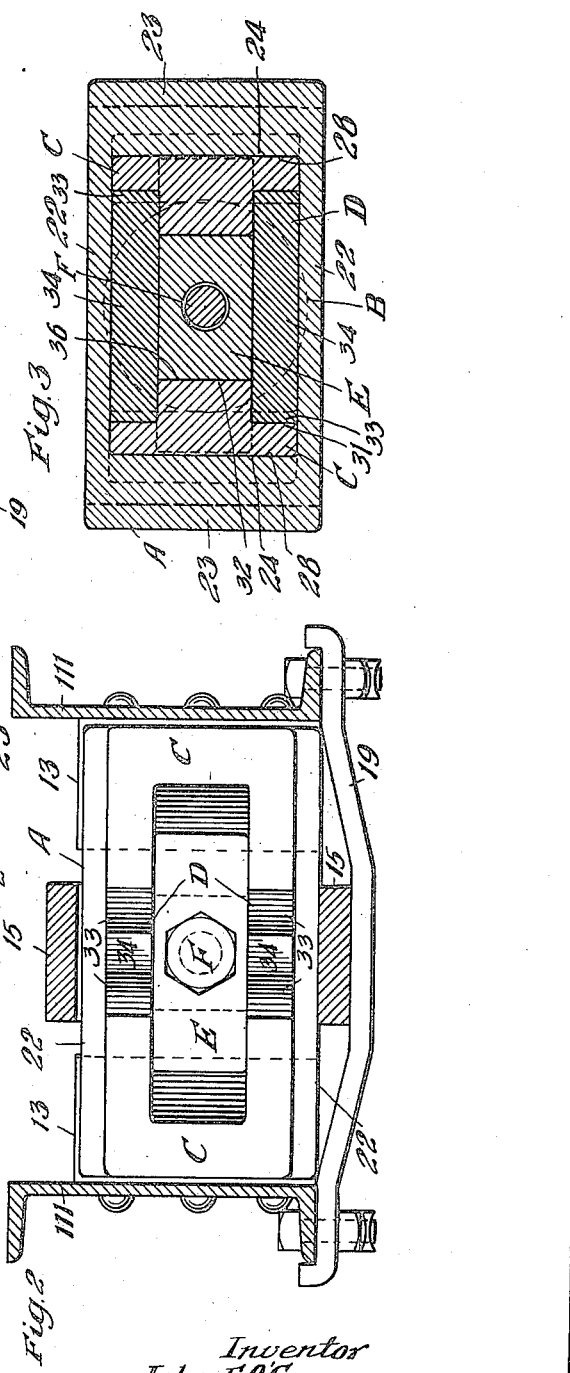
Inventor
John F. O'Connor

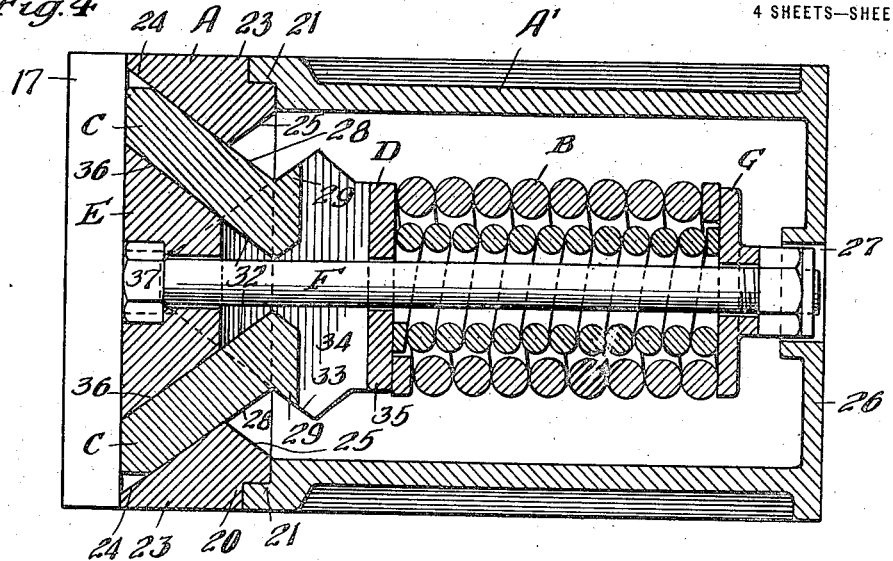
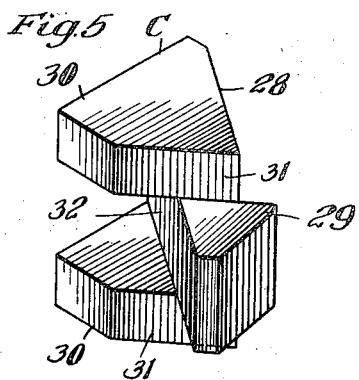
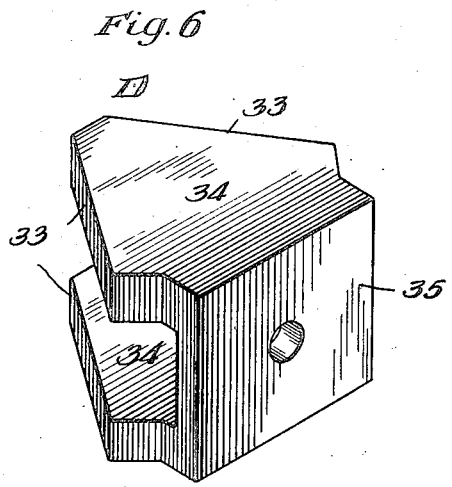

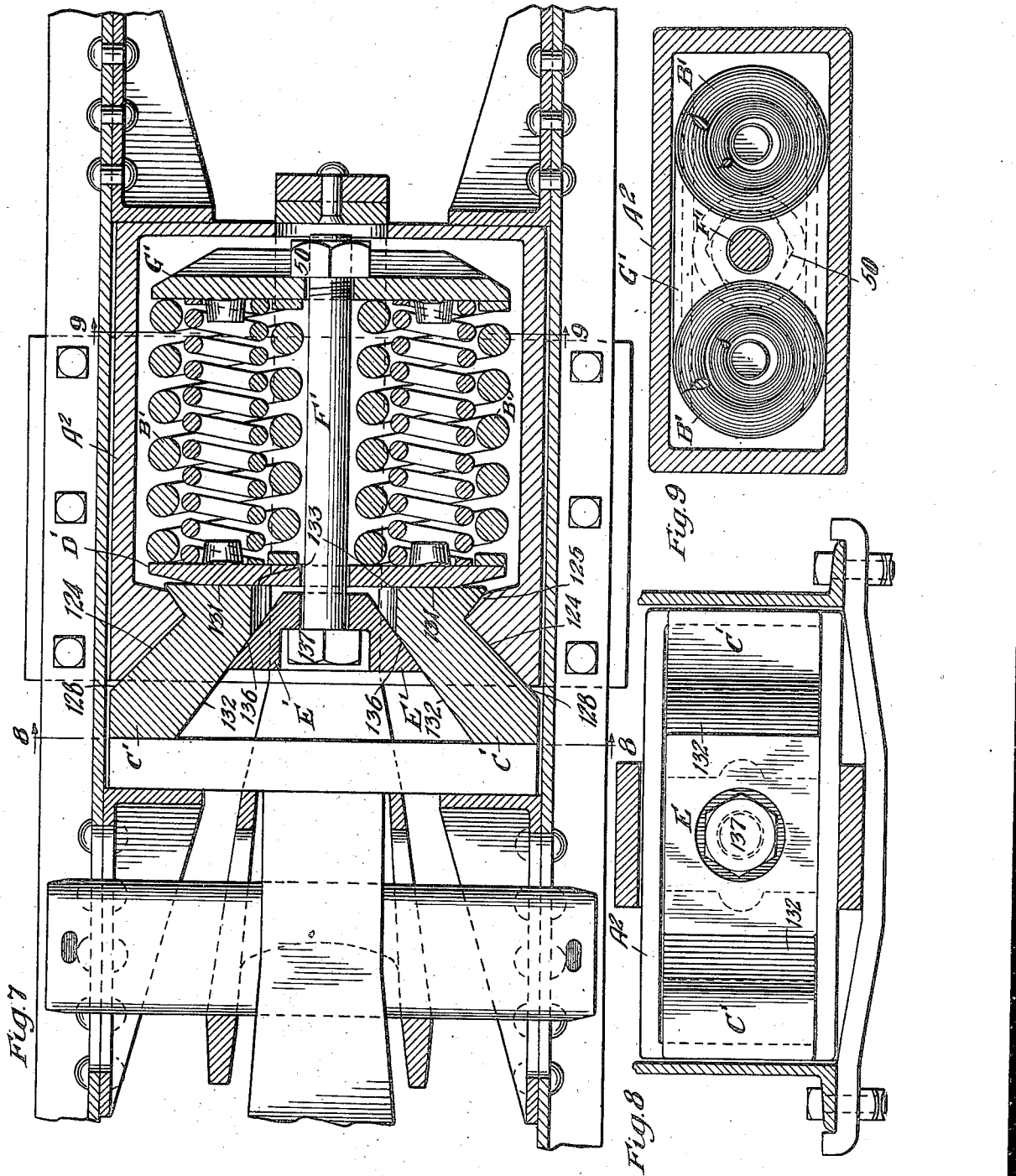

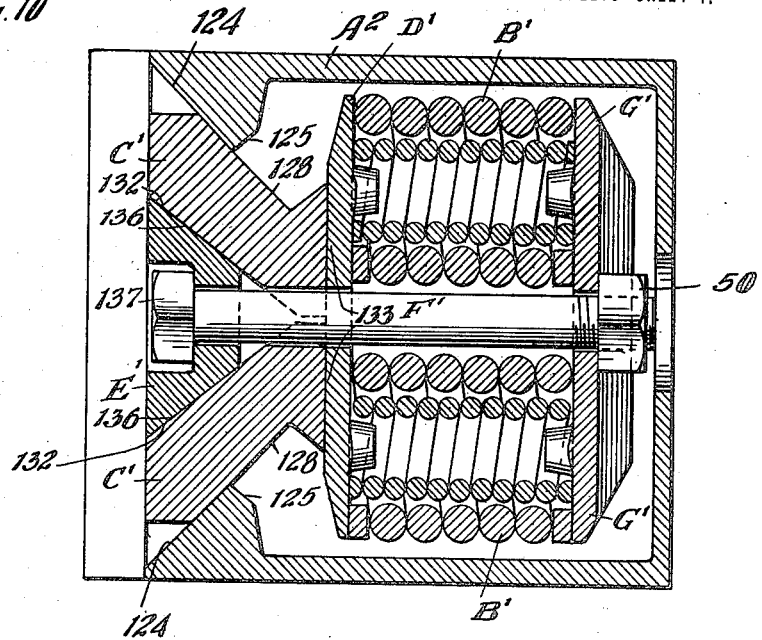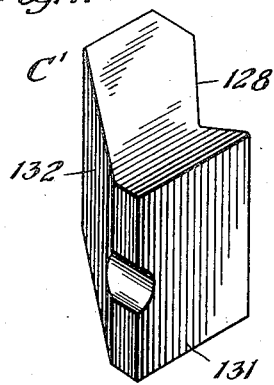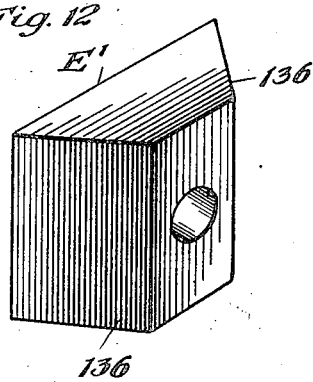

Patented Oct. 10, 1922.

1,431,324

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed November 1, 1920. Serial No. 421,169.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein a spring resistance is employed not only to afford a direct resistance to movement of the friction elements but is also utilized in directly governing the degree of wedging or spreading action exerted against the friction shoes in such a way that the wedging or spreading forces are proportional to the degree of compression of the spring resistance.

Another object of the invention is to provide a friction shock absorbing mechanism of the character indicated wherein are employed, among other elements, a friction shell, friction shoes, wedging means, and a spring resistance so arranged that the friction shoes are directly resisted in their movement by the spring resistance and the wedging means are influenced from the same spring resistance in such manner that the greater the compression on the spring the greater the wedging or spreading pressure exerted against the shoes.

Other objects of the invention will more clearly appear from the description hereinafter following, considered in connection with the drawings.

In the drawings forming a part of this specification, Figure 1 is a horizontal, longitudinal, sectional view of a portion of a railway draft rigging showing my improvements in connection therewith. Figure 2 is a vertical, transverse, sectional view corresponding substantially to the line 2—2 of Figure 1. Figure 3 is a vertical, transverse, sectional view, corresponding substantially to the line 3—3 of Figure 1. Figure 4 is a view similar to Figure 1 but illustrating the position assumed by the various parts of the shock absorbing mechanism at the end of the compression stroke. Figure 5 is a detail perspective of one of the friction shoes employed in the construction shown in Figures 1 to 4. Figure 6 is a detail perspective of the combination wedge spring follower employed in the construction shown in Figures 1 to 4. Figures 7, 8, 9 and 10 are views corresponding respectively to Figures 1, 2, 3 and 4, but illustrating another embodiment of the invention, Figures 8 and 9 corresponding to section lines 8—8 and 9—9 of Figure 7. Figure 11 is a detail perspective of one of the friction shoes illustrated in Figures 7 to 10. And Figure 12 is a detail perspective of the wedge employed in the construction shown in Figures 7 to 10.

In said drawings and referring first to the construction illustrated in Figures 1 to 6, inclusive, 111—111 denote channel center or draft sills of a railway car to the inner faces of which are secured front stop lugs 112—112 and rear stop lugs 13—13. A portion of a drawbar is indicated at 14, the same being operatively associated with the shock absorbing mechanism proper by a hooded cast yoke 15 and coupler key 16. The shock absorbing mechanism proper is mounted within the yoke 15, as are also a front follower 17 and rear follower 18. The yoke and parts disposed therein are supported in operative position by a detachable saddle plate 19.

The improved shock absorbing mechanism proper, as shown, comprises, broadly, a friction shell proper A; a spring cage A'; a spring resistance B; a pair of friction shoes C—C; a spring follower D; a wedge E; a retainer bolt F; and a second spring follower G.

In the particular embodiment illustrated, the shell A is made separate from the spring cage A' although, as will be understood by those skilled in the art, the two might well be formed integrally. As shown, the shell A is shouldered as indicated at 20 and the cage A' is correspondingly notched as indicated at 21 so as to obtain a secure seating between the shell and cage. The shell A is of generally rectangular formation as best shown in Figure 3, the same having upper and lower walls 22—22 and side walls 23—23. The latter are provided on their inner sides with opposed rearwardly converging friction surfaces 24—24. Rearwardly of the friction surfaces 24, the shell A is formed with oppositely converged faces 25—25 adapted to act as limiting shoulders for the shoes C, as hereinafter described. The spring cage A' is also of generally rectangular formation and has an integral rear wall 26 with an opening 27 therein to accommodate the rear end of the bolt F and nut applied thereon.

The two friction shoes C are of like construction and each is formed on its outer side with a friction surface 28 corresponding to and cooperable with the adjacent friction shell surface 24. At its inner end, each shoe C is formed with a laterally extended triangular projection as indicated at 29, adapted to engage the shoulder surface 25 of the shell and limit the outward movement of the shoe with respect to the shell, as will be clearly seen from Figure 1. By referring to Figure 5, it will be seen that each shoe C is formed with spaced or upper and lower wings 30—30 each of which has an inclined friction wedge face 31—31, the sets of faces 31 on the two shoes diverging rearwardly or inwardly of the shell. In addition, each shoe C is formed with a centrally disposed friction surface 32 which, in the construction illustrated in Figures 1 to 6, extends substantially parallel to the outer friction surface 28 of the shoe.

The friction wedge faces 31 of the shoes C are adapted to cooperate with corresponding friction wedge faces 33—33 formed on the edges of upper and lower flanges 34—34 of the wedge spring follower D. The latter has a rear integral vertically extending wall 35 adapted to bear against the forward end of the double coil spring B.

The wedge E is in the form of a substantially solid block having wedge faces 36—36 on the opposite sides thereof, said faces 36 cooperating with the corresponding faces 32 of the shoes C. In this connection, it will be understood that the vertical height of the wedge E is such as to adapt it to fit between the wings 30 of the shoes and the wings 34 of the follower D in order to permit relative movement between the various parts during the action of the mechanism.

The spring follower G is carried by the bolt F at the rear end of the latter, the forward end of the bolt F being held by the bolt head 37 in a suitable socket in the wedge E. As clearly shown in Figure 1, the bolt F extends through suitable alined perforations in the wedge E, follower D, follower G, and through the center of the spring B. Also from an inspection of Figure 1 it will be seen that the forward face of the wedge E is normally flush with the outer end of the friction shell A.

The operation of the mechanism is as follows, assuming an inward or buffing movement of the drawbar. As the front follower 17 is forced rearwardly by the drawbar, the shoes C are compelled to travel rearwardly or inwardly of the friction shell which of course is held stationary by the spring cage A', rear follower 18 and rear stop lugs 13. As the shoes C are forced inwardly of the shell, they are simultaneously forced laterally toward each other and thereby produce an accelerated rearward or inward movement of the wedge spring follower D due to the sliding action of the faces 32 on the faces 33. Manifestly, the spring B is thereby compressed from its forward end and an equal reaction in the spring will occur at the rear end against the follower G. The latter in turn transfers the spring pressure to the retainer bolt F which in turn exerts a corresponding rearwardly or inwardly directed force on the wedge E. During the inward movement of the shoes C, sliding friction is generated between the shoes and the wedge E. Due to the fact that the inner and outer friction surfaces 28 and 32 of the shoes are parallel, there will be no longitudinal travel of the wedge E but, on the contrary, it will remain substantially stationary. From the preceding description of the operation of the device, it will be seen that the shoes C are not only directly resisted in their movements by the spring B but that the wedging or spreading action of the wedge E is dependent upon and proportional to the degree of compression of the spring B. With the construction shown, a large number and large area of friction surfaces are provided, friction being generated between the shoes and the wedge follower D, and between the shoes and the wedge E. The release will be readily effected inasmuch as the expanding force of the spring tends to force the shoes outwardly of the flaring friction shell.

Referring next to the construction illustrated in Figures 7 to 12 inclusive, the arrangement of draft sills, stop lugs, drawbar, yoke, key, and front follower is or may be the same as the corresponding parts hereinbefore described. A rear main follower, such as the follower 18, is not employed in the construction illustrated in Figure 7. The modified construction employs a combined friction shell and spring cage casting $A^2$; twin spring resistances B'—B'; a pair of friction shoes C'—C'; a front spring follower D'; a wedge E'; a bolt F'; and a rear spring follower G'.

The casting $A^2$ is of generally rectangular formation with the friction shell proper at the forward or outer end thereof, the latter being formed with rearwardly or inwardly converging friction surfaces 124—124. Inwardly of the surfaces 124, the shell is formed with oppositely extending faces 125—125 adapted to act as stops in limiting the outward movements of the shoes C' as in the case of the construction shown in Figure 1.

The springs B' are disposed in horizontal twin arrangement and the same bear at their forward ends against the plate-like follower D' and at their rear ends against the plate-like follower G'. The bolt F' extends through both of said followers, the nut 50 at the rear end of the bolt holding the follower G' and the head 137 of the bolt being seated in a suitable socket in the wedge E'.

The shoes C' are of like construction and each is formed on its outer side with friction surfaces 128 cooperable with the shell surfaces 124. On their inner sides, the shoes C' are formed with friction surfaces 132 adapted to cooperate with corresponding surfaces 136 on the wedge E'. In this particular embodiment of the invention, however, the friction surfaces 128 and 132 of each shoe are not made parallel but on the contrary the surfaces 132 are made to extend at a somewhat more acute angle with respect to the axis of the mechanism than the surfaces 128. With this construction, bearing in mind the preceding description of the operation of the construction illustrated in Figure 1, the wedge E' will be given a negative acceleration or movement as the shoes C' are forced inwardly of the shell. To permit of this action, it will be noted from an inspection of Figure 7 that the outer face of the wedge E is normally within the outer end of the shell so that, as the shoes are forced to their extreme inner position, as illustrated in Figure 10, the wedge E' will travel slightly outwardly or in the opposite direction to a position where the outer end of the wedge E' is flush with the end of the shell as clearly shown in Figure 10.

Instead of employing diagonally engaging faces between the shoes and front spring follower shown in Figure 1, I may employ the flat transversely extending friction surfaces 131 and 133 on the shoes C' and follower D' respectively. This eliminates differential or accelerated movement of the follower D', the latter moving longitudinally the same distance only as the shoes C'. There will, however, be friction generated between the shoes C' and the follower D' owing to the lateral movement imparted to the shoes C' as the latter are forced inwardly of the shell. A detailed description of the operation of the construction illustrated in Figures 7 to 12 is not deemed necessary in view of the prior described operation in connection with the other form of the invention.

I have herein shown and described what I now consider the preferred manner of carrying out the invention but it will be obvious to those skilled in the art that various changes and modifications may be made without departing from the spirit of the invention and all such changes and modifications are contemplated that come within the scope of the claims appended hereto.

I claim:

1. In a friction shock absorbing mechanism, the combination with a friction shell having inwardly converged friction surfaces; of friction shoes having outer friction surfaces cooperable with the friction surfaces of the shell and provided also with inwardly converged inner friction surfaces; pressure-creating means frictionally cooperable with said inner friction surfaces of the shoes; a spring resistance; and means for transferring reactive pressure from one end of said spring resistance to said shoes and the reactive pressure from the opposite end of the spring resistance to said pressure-creating means.

2. In a friction shock absorbing mechanism, the combination with a friction shell having inwardly converged friction surfaces; of friction shoes having outer friction surfaces cooperable with the friction surfaces of the shell and provided also with inwardly converged inner friction surfaces; pressure-creating means frictionally cooperable with said inner friction surfaces of the shoes; and means, including a spring resistance unit, for yieldingly resisting inward movement of the shoes with respect to the shell and simultaneously exerting a variable force on said pressure-creating means, the latter force being exerted in the general direction of movement of the shoes.

3. In a friction shock absorbing mechanism, the combination with a friction shell having inwardly converged friction surfaces; of friction shoes having outer friction surfaces cooperable with those of the shell and provided also with inwardly converged inner friction surfaces; a wedge disposed between said shoes; a spring resistance adapted at one end to yieldingly resist inward movement of the shoes with respect to the shell; and means interposed between the opposite end of the spring resistance and said wedge adapted to maintain a constant relation between said wedge and said other end of the spring resistance.

4. In a friction shock absorbing mechanism, the combination with a friction shell having interior friction surfaces; of a plurality of friction shoes having exterior friction surfaces cooperable with those of the shell, said shoes having also inner friction surfaces converged inwardly of the shell; a wedge interposed between said shoes and having faces cooperable with said inner surfaces of the shoes; a spring resistance; means for transferring pressure from the shoes directly to one end of said spring resistance; and means for transferring reactive pressure from the opposite end of the spring resistance to said wedge.

5. In a friction shock absorbing mechanism, the combination with a friction shell having inwardly converged friction surfaces; of a plurality of friction shoes having exterior friction surfaces cooperable with the shell, said shoes having also interior inwardly converged friction surfaces and additional inwardly diverged friction surfaces; a wedge interposed between said shoes and cooperable with said inner inwardly converged friction surfaces thereof; a spring resistance; a combined wedge follower interposed between said spring resistance and said shoes, said wedge follower having faces cooperable with said inwardly diverged faces of the shoes; an abutment at the end of the spring resistance remote from the shoes; and a connector between said abutment and said first named wedge.

6. In a friction shock absorbing mechanism, the combination with a friction shell having inwardly converged friction surfaces; of friction shoes cooperable with said shell having exterior friction surfaces inwardly converged and inner friction surfaces similarly converged; a floating wedge interposed between said shoes; a spring resistance; a follower at the end of the spring resistance adjacent the shoes and frictionally cooperable with the latter; a follower at the opposite end of the spring resistance, and a connector extending between said last named follower and the wedge adapted to maintain the distance between the wedge and said follower constant.

7. In a friction shock absorbing mechanism, the combination with a friction shell having inwardly converged friction surfaces; of friction shoes cooperable with said shell having exterior friction surfaces similarly converged and inner friction surfaces inwardly converged; cooperating means on said shoes and shell adapted to limit the outward movement of the shoes with respect to the shell; a wedge interposed between said shoes and frictionally cooperable therewith; a spring resistance; a follower at the end of the spring resistance adjacent the shoes and frictionally cooperable with the latter; a follower at the opposite end of the spring resistance; and a tension member connecting said last named follower with the wedge.

In witness that I claim the foregoing I have hereunto subscribed my name this 27th day of Oct., 1920.

JOHN F. O'CONNOR.